Figure 1:
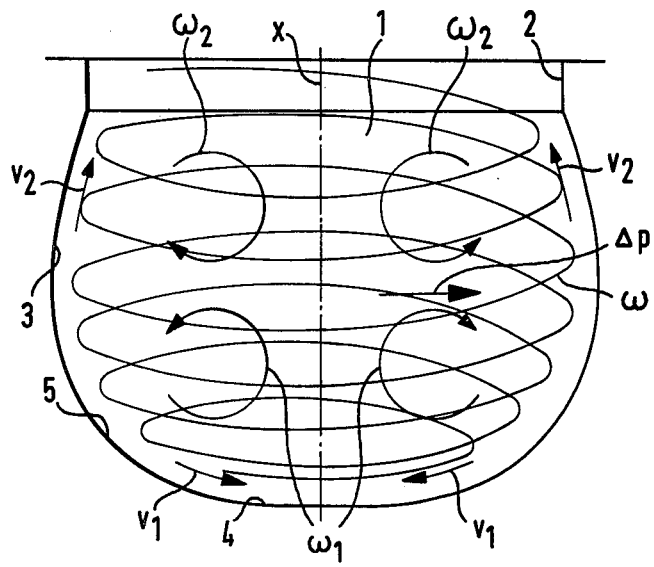

United States Patent [19]
Buddenhagen

[11] 4,235,202
[45] Nov. 25, 1980

[54] INTERNAL COMBUSTION ENGINE

[75] Inventor: Uwe Buddenhagen, Munich, Fed. Rep. of Germany

[73] Assignee: Maschinenfabrik Augsburg-Nürnberg Aktiengesellschaft, Nuremburg, Fed. Rep. of Germany

[21] Appl. No.: 18,471

[22] Filed: Mar. 8, 1979

[30] Foreign Application Priority Data

Mar. 8, 1978 [DE] Fed. Rep. of Germany ....... 2809914

[51] Int. Cl.³ ............................. F02B 3/00; F02F 3/26
[52] U.S. Cl. .................................. 123/276; 123/193 P
[58] Field of Search ................. 123/30 C, 30 D, 32 C, 123/32 D, 32 ST, 193 P, 193 CP, 193 R, 191 R

[56] References Cited

U.S. PATENT DOCUMENTS 2,903,308  10/1959  Meurer et al. ...................... 123/30 D

FOREIGN PATENT DOCUMENTS

| | | | |
|---|---|---|---|
| 745396 | 12/1943 | Fed. Rep. of Germany | 123/32 C |
| 1576014 | 6/1970 | Fed. Rep. of Germany | 123/30 C |
| 2425554 | 1/1975 | Fed. Rep. of Germany | 123/193 P |
| 2815717 | 11/1978 | Fed. Rep. of Germany | 123/193 P |
| 745367 | 5/1933 | France | 123/32 C |
| 421101 | 12/1934 | United Kingdom | 123/32 C |

*Primary Examiner*—P. S. Lall
*Attorney, Agent, or Firm*—Becker & Becker, Inc.

[57] ABSTRACT

An internal combustion engine having in the piston crown or cylinder head a combustion chamber in the shape of a body of revolution with a constricted throat. At the end of the compression stroke, the combustion chamber accommodates substantially all of the air for combustion which is imparted a rotation about the longitudinal axis of the combustion chamber. Taking into account the respectively specified combustion chamber volume, the maximum combustion chamber diameter, the combustion chamber depth, the inclination or curvature of the combustion chamber wall, and the inclination or curvature of the transition from the combustion chamber wall to the combustion chamber bottom are matched in such a way that, utilizing the friction occurring between the combustion chamber wall and the rotating air, a boundary layer or interface flow is produced, resulting in velocity components of a predetermined intensity extending in a direction at least substantially perpendicular to the rotating motion of the air, the velocity components in turn generating secondary turbulence.

5 Claims, 6 Drawing Figures

INTERNAL COMBUSTION ENGINE

The present invention relates to an internal combustion engine having a combustion chamber in the shape of a body of revolution with a constricted throat in the piston crown or cylinder head, said combustion chamber accommodating at the end of the compression stroke substantially all of the air for combustion which is imparted a rotation about the longitudinal axis of the combustion chamber.

In the cylinders and/or combustion chambers of internal combustion engines, especially of direct-injection internal combustion engines, there is generally an intensive air and/or gas motion which is initiated during the intake process and is necessary for a good mixture preparation, i.e. for a uniform mixing of the fuel with the air for combustion.

In most cases today, the air and/or gas motion is accurately controlled in order to simultaneously achieve a good and orderly combustion. This is achieved in a simple manner, for instance by providing, as mentioned hereinbefore, a combustion chamber in the shape of a body of revolution in the piston crown or cylinder head, and by imparting to the inflowing air for combustion a rotary motion by means of swirl ports, deflector valves, or similar devices known in the art, this rotary motion being maintained in the combustion chamber. Frequently, the fuel is also injected in the immediate vicinity of the combustion chamber wall, or is even applied as a thin film directly to the latter, where it is removed or picked up by, and mixed with, the rotating air as vapor.

In such systems it has frequently been found that mixture formation and, consequently, combustion are nevertheless incomplete, which of course affects the power, efficiency, fuel consumption and, especially, the quality of the exhaust gas.

In order to avoid this drawback, it was proposed, for internal combustion engines using the system of wall deposition of the fuel according to the U.S. Pat. No. 3,809,031-Meurer et al. issued May 7, 1974 (belonging to the assignee of the present invention), to adopt a longer free fuel jet or stream and to provide behind the impingement point of the fuel jet a downward step, by means of which the fuel film, which spreads due to its kinetic energy and the rotating air layers, separates or lifts off at least partly and mixes directly with the air. In particular, the local turbulence which forms as a result of the step is intended to increase pre-oxidation of part of the fuel.

It was furthermore disclosed previously to provide additional means to achieve a pre-oxidation of the fuel in the form of a plurality of downward steps in the combustion chamber wall transverse to the direction of air flow in the area of the impingement of the fuel and at that part of the combustion chamber wall where film formation is to take place. In other words, the fuel is initially carried from one step to the next to be preoxidized and mixed with the air.

Providing such additional means did bring about an improvement of mixture formation, but only partly so. It was often discovered that fuel accumulations frequently occur in the steps or grooves located in the area of the fuel film; combustion of these accumulations is then delayed in accordance with local structural conditions, as a result of which the advantage secured by the additional means is partly offset again. Added to this is the fact that the steps partly interfere with the air rotation required for orderly combustion.

Finally, a copending U.S. patent application Ser. No. 82,942-Buddenhagen filed Oct. 9, 1979 as a straight continuation of Ser. No. 823,136-Buddenhagen filed Aug. 9, 1979, now abandoned, (belonging to the assignee of the present invention) discloses a rising step in the combustion chamber wall arranged ahead of the fuel film looking in the direction of the air rotation approximately transverse to the air swirl, as a result of which the laminar boundary layer flow over the fuel film is destroyed.

All the means referred to have the common drawback that they are effectively applicable only to direct injection internal combustion engines using the system of wall deposition of the fuel, because they are designed to remove the film from the combustion chamber wall.

It is therefore an object of the present invention to find new ways and means by which an improved mixture formation and, consequently, combustion is made possible for internal combustion engines generally and, in particular, for direct internal combustion engines, provided the engine only fulfills the prerequisites defined initially. This may also be the case in precombustion-chamber engines.

This object, and other objects and advantages of the present invention, will appear more clearly from the following specification in connection with the accompanying drawings, in which:

FIG. 1 is a longitudinal section through a combustion chamber in which the flow conditions of the air are shown schematically; and FIGS. 2 to 6 are longitudinal sections through combustion chambers according to the present invention, with each combustion chamber representing the optimum shape for a given ratio of combustion chamber volume to combustion chamber depth, all combustion chambers being intended for engines employing the method of wall deposition of the fuel.

The combustion chamber of the internal combustion engine of the present invention is characterized primarily, while taking into account the respectively specified combustion chamber volume, by matching the maximum combustion chamber diameter, the combustion chamber depth, the inclination or curvature of the combustion chamber wall, and the inclination or curvature of the transition from the combustion chamber wall to the combustion chamber bottom, in such a way that, utilizing the friction occurring between the combustion chamber wall and the rotating air, a boundary layer or interface flow is produced, resulting in velocity components of a predetermined intensity extending in a direction perpendicular or substantially perpendicular to the rotating motion of the air, the velocity components in turn generating secondary turbulence.

Thus, the invention deals with an unprecedented possibility of producing secondary flows without impairing the main flow by grooves or steps in the combustion chamber. This is accomplished by practical utilization of the boundary layer flows which more or less always exist, this being achieved by adopting a specific shape of the combustion chamber. The underlying consideration has been that the pressure gradient of the main flow, as seen from the combustion chamber axis towards the combustion chamber wall, is positive due to centrifugal force and, with an appropriate shape of the combustion chamber, affects the boundary layer in such a way that the individual particles are displaced along the combustion chamber wall. Velocity components extending at right angles to the main flow result and give rise to secondary turbulence. The centrifugal force in the boundary layer will be less than the pressure increase; hence, the deflection. Based on this realization, it is possible with a given combustion chamber volume to influence the secondary flows, for a given condition of the cylinder charge as defined by the main flow and the concentration distribution, with the aid of very precise shaping of the combustion chamber contour, in such a way that optimum conditions are created for mixture formation, preparation, and combustion of the charge.

Primarily, it is the combustion chamber depth which determines the proportion of secondary flows in the total flows, whereby their magnitude can be varied relatively easily. In addition, the inception or start of the velocity components and, consequently, the location of the secondary turbulence—viewed in the direction of the combustion chamber depth—are easily determined by the choice of the inclination of the combustion chamber wall and the transition from the combustion chamber wall to the combustion chamber bottom.

It has been found that the influence of the secondary turbulence is particularly pronounced in direct-injection internal combustion engines, where the major portion of the fuel is sprayed by an injector, located near the combustion chamber edge, directly onto the combustion chamber wall, where it spreads filmwise because this causes nearly all of the fuel to be placed in the region of the boundary layer flow. In this case, it is proposed as a further development of the invention that the inclinations of the combustion chamber wall and the transition from the combustion chamber wall to the combustion chamber bottom be matched to each other in such a way that an optimum film spreading and separation of the fuel from the combustion chamber wall is effected, and that the amounts of fuel and air available over the full depth of the combustion chamber are at a uniformly favorable ratio to each other.

It follows from this that the concept of an absolutely uniform combustion chamber shape is abandoned. Rather, the combustion chamber shape is always matched precisely to the operating conditions of an engine, with the combustion chamber volume and the combustion chamber depth being parameters of special importance.

Referring now to the drawings in detail, FIG. 1 shows a combustion chamber 1 in the shape of a body of revolution which is essentially bounded by a constricted throat 2, a lateral combustion chamber wall 3, a combustion chamber bottom 4, and a curvature or transition 5 from the combustion chamber wall 3 to the combustion chamber bottom 4. The main flow $\omega$ of air for combustion forms a swirl about the longitudinal axis x of the combustion chamber. The swirl is produced, by appropriate design of the inlet port or other means, during introduction of the air. The pressure gradient $\Delta$ p of the main flow—from the longitudinal axis x towards the wall 3 of the combustion chamber—is positive due to the centrifugal force.

In the vicinity of the combustion chamber wall 3, a boundary layer flow is produced by the friction of the rotating air on the combustion chamber wall 3, as a result of which the velocity of the main flow $\omega$ is slowed down, so that the centrifugal force is smaller than the pressure rise. Consequently, the individual particles are displaced along the combustion chamber wall, with velocity components $v_1$ being produced in the direction towards the combustion chamber bottom 4, and velocity components $v_2$ being produced in the direction towards the combustion chamber throat 2. These velocity components are eventually deflected towards the middle of the combustion chamber, forming secondary turbulences $\omega_1$, $\omega_2$. The secondary turbulences $\omega_1$, $\omega_2$ now assist the main flow $\omega$, accelerating fuel separation and mixture formation. The intensity of the secondary turbulences $\omega_1$, $\omega_2$ can essentially be controlled by the intensity of the deflection, as a result of which the desired effect can be easily achieved.

Figure 2:
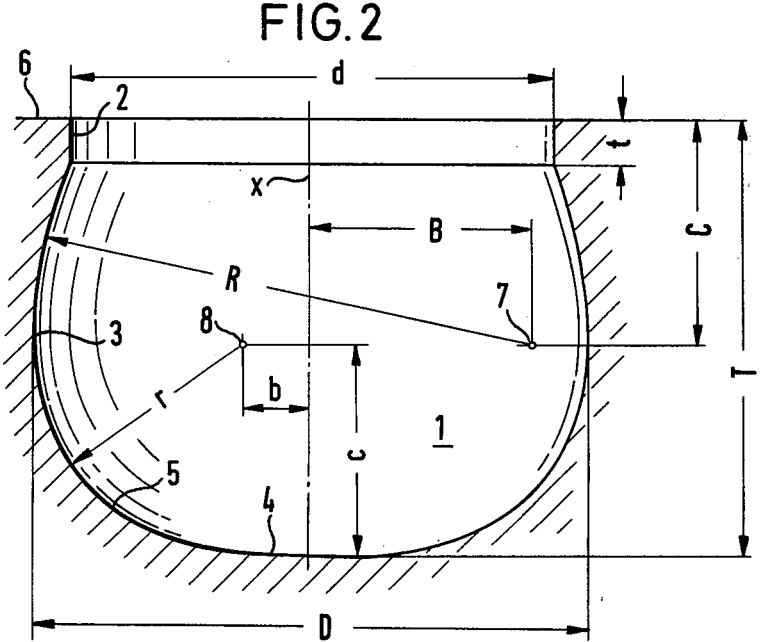

The combustion chamber shown in FIG. 2 is designed specifically for an air compressing, direct injection internal combustion engine in which the fuel is deposited on the combustion chamber wall 3 as a thin film. The ratio V/T ranges between 20.0 cm$^2$ and 22.29 cm$^2$, V denoting the combustion chamber volume, and T the combustion chamber depth. The best mixture formation is obtained when the diameter d of the combustion chamber throat 2 is 0.839 to 0.911 times, its depth t is 0.036 to 0.125 times, and the maximum combustion chamber depth T (measured from the piston crown 6) is 0.732 to 0.839 times the maximum combustion chamber diameter D. The radius generating the inclination of the combustion chamber wall 3 has a length R of 0.875×D to 0.929×D, and its starting point 7 moves on a circle which is at a distance B of 0.375×D to 0.446×D from the longitudinal axis x of the combustion chamber and is located at a depth C of 0.375×D to 0.464×D measured from the piston crown 6. The radius generating the transition 5 of the combustion chamber wall 3 to the combustion chamber bottom 4 has a length r of 0.321×D to 0.446×D, and its starting point 8 moves on an imaginary circle which is located at a distance b of 0.054×D to 0.179×D from the longitudinal axis x of the combustion chamber, and at a distance c of 0.321×D to 0.446×D from the combustion chamber bottom 4.

FIGS. 3 to 6 likewise show specific combustion chambers for engines for which the combustion chamber shown in FIG. 2 is also intended, but have different dimensions as shown in the following table due to the different V/T ratios. The values for FIG. 2 are repeated for comparison.

Figure 3:
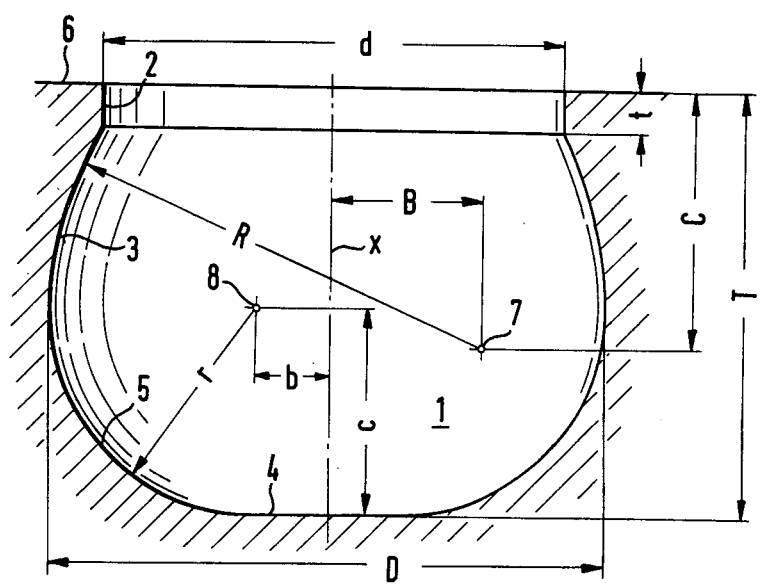
Figure 4:
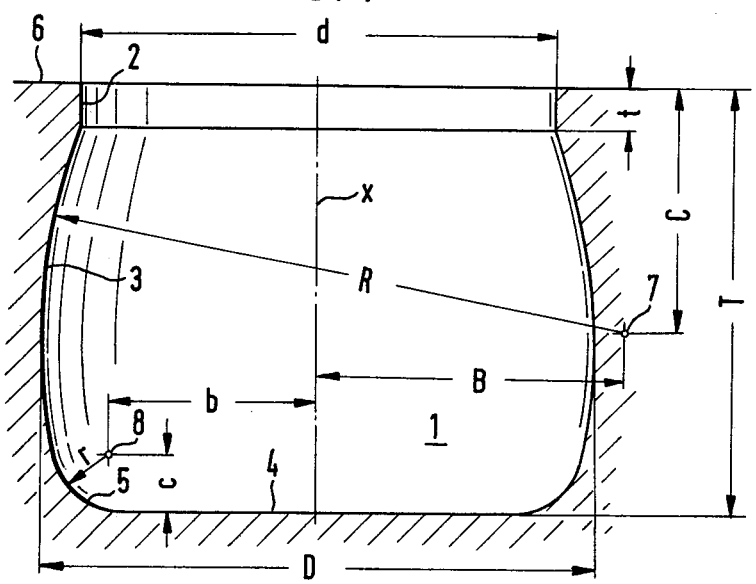
Figure 5:
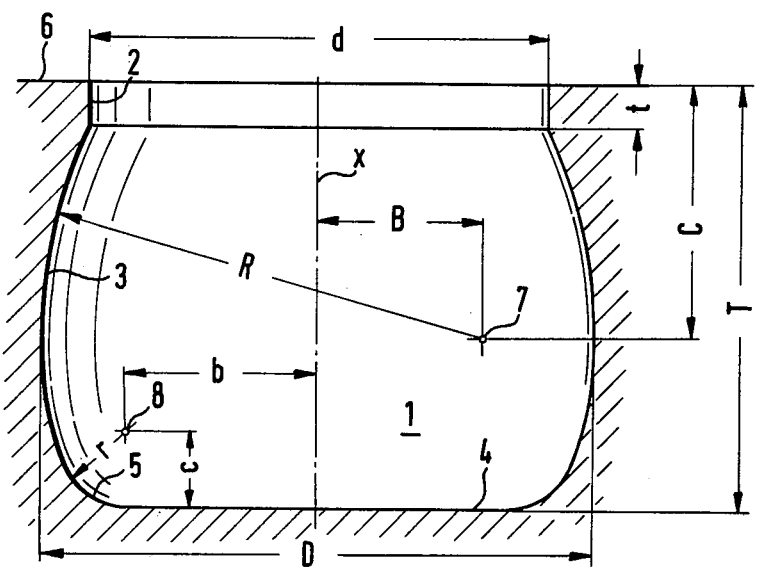
Figure 6:
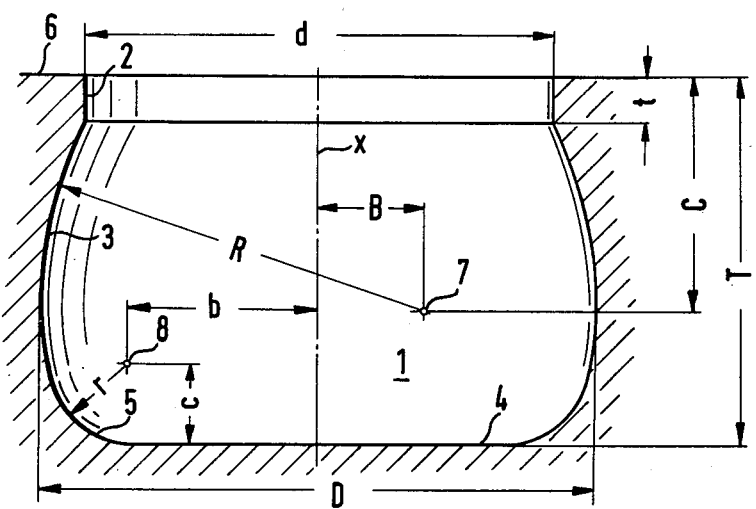

| Combustion Chamber of | V/T in cm$^2$ | d × D | t × D | T × D | R × D | B × D | C × D | r × D | b × D | c × D |
|---|---|---|---|---|---|---|---|---|---|---|
| Fig. 2 | 20.00–22.29 | .839–.911 | .036–.125 | .732—.839 | .875–.929 | .375–.446 | .375–.464 | .321–.446 | .054–.179 | .321–.44 |
| Fig. 3 | 22.3–22.74 | .81–.879 | .036–.125 | .707–.81 | .724–.793 | .224–.293 | .362–.431 | .345–.397 | .103–.138 | .345–.39 |
| Fig. 4 | 23.0–25.00 | .81–.899 | .035–.123 | .791–.825 | 1.053–1.14 | .561–.632 | .404–.474 | .07–.14 | .333–.404 | .07–.14 |
| Fig. 5 | 22.75–22.99 | .81–.879 | .034–.212 | .707–.81 | .707–.81 | .224–.293 | .345–.431 | .103–.172 | .276–.345 | .103–.17 |
| Fig. 6 | 14.8–16.0 | .825–.895 | .035–.123 | .614–.702 | .614–.702 | .123–.193 | .316–.386 | .105–.175 | .298–.368 | .105–.17 |

The present invention is, of course, in no way restricted to the specific disclosure of the specification or drawings, but also encompasses any modifications within the scope of the appended claims.

What I claim is:

1. An internal combustion engine having in a respective piston crown a combustion chamber for accommodating, at the end of a compression stroke, substantially all of the air for combustion, said combustion chamber comprising a constricted throat, a combustion chamber wall, and a combustion chamber bottom, and, for imparting to air for combustion a rotation about the longitudinal axis of said combustion chamber, being in the shape of a body of revolution; the maximum combustion chamber diameter, the combustion chamber depth, the inclination or curvature of said combustion chamber wall, and the inclination or curvature of the transition from said wall to said combustion chamber bottom being matched, taking into account the respectively specified combustion chamber volume, in such a way that when air for combustion is introduced and rotates in said combustion chamber, the friction occurring between said combustion wall and the rotating air is utilized for producing a boundary layer or interface flow, resulting in velocity components of a predetermined intensity extending in a direction at least substantially perpendicular to the rotating motion of the air, said velocity components in turn generating secondary turbulences for aiding mixture of fuel and air for combustion, the ratio of the combustion chamber volume to the combustion chamber depth being 20.00 $cm^2$ to 22.29 $cm^2$, the diameter of said combustion chamber throat being 0.839 to 0.911 times the maximum combustion chamber diameter D, the depth of said throat being 0.036 to 0.125×D, the maximum combustion chamber depth measured from said piston crown being 0.732 to 0.839×D, the radius giving the inclination or curvature of said combustion chamber wall having a length of from 0.875 to 0.929×D and a starting point which moves on an imaginary circle which is at a distance of 0.375 to 0.446×D from the longitudinal axis of said combustion chamber and at a depth of 0.375 to 0.464×D measured from said piston crown, and the radius giving the transition from said combustion chamber wall to said combustion chamber bottom having a length of 0.321 to 0.446×D and a starting point which moves on an imaginary circle which is at a distance of 0.54 to 0.179×D from the longitudinal axis of said combustion chamber and at a distance of 0.321 to 0.446×D from said combustion chamber bottom.

2. An internal combustion engine having in a respective piston crown a combustion chamber for accommodating, at the end of a compression stroke, substantially all of the air for combustion, said combustion chamber comprising a constricted throat, a combustion chamber wall, and a combustion chamber bottom, and, for imparting to air for combustion a rotation about the longitudinal axis of said combustion chamber, being in the shape of a body of revolution; the maximum combustion chamber diameter, the combustion chamber depth, the inclination or curvature of said combustion chamber wall, and the inclination or curvature of the transition from said wall to said combustion chamber bottom being matched, taking into account the respectively specified combustion chamber volume, in such a way that when air for combustion is introduced and rotates in said combustion chamber, the friction occurring between said combustion chamber wall and the rotating air is utilized for producing a boundary layer or interface flow, resulting in velocity components of a predetermined intensity extending in a direction at least substantially perpendicular to the rotating motion of the air, said velocity components in turn generating secondary turbulences for aiding mixture of fuel and air for combustion, the ratio of the combustion chamber volume to the combustion chamber depth being 22.3 $cm^2$ to 22.74 $cm^2$, the diameter of said combustion chamber throat being 0.81 to 0.879 times the maximum combustion chamber diameter D, the depth of said throat being 0.036 to 0.125×D, the maximum combustion chamber depth measured from said piston crown being 0.707 to 0.81×D, the radius giving the inclination or curvature of said combustion chamber wall having a length of from 0.724 to 0.793×D and a starting point which moves on an imaginary circle which is at a distance of 0.224 to 0.293×D from the longitudinal axis of said combustion chamber and at a depth of 0.362 to 0.431×D measured from said piston crown, and the radius giving the transition from said combustion chamber wall to said combustion chamber bottom having a length of 0.345 to 0.397×D and a starting point which moves on an imaginary circle which is at a distance of 0.103 to 0.138×D from the longitudinal axis of said combustion chamber and at a distance of 0.345 to 0.397×D from said combustion chamber wall.

3. An internal combustion engine having in a respective piston crown a combustion chamber for accommodating, at the end of a compression stroke, substantially all of the air for combustion, said combustion chamber comprising a constricted throat, a combustion chamber wall, and a combustion chamber bottom, and, for imparting to air for combustion a rotation about the longitudinal axis of said combustion chamber, being in the shape of a body of revolution; the maximum combustion chamber diameter, the combustion chamber depth, the inclination or curvature of said combustion chamber wall, and the inclination or curvature of the transition from said wall to said combustion chamber bottom being matched, taking into account the respectively specified combustion chamber volume, in such a way that when air for combustion is introduced and rotates in said combustion chamber, the friction occurring between said combustion chamber wall and the rotating air is utilized for producing a boundary layer or interface flow, resulting in velocity components of a predetermined intensity extending in a direction at least substantially perpendicular to the rotating motion of the air, said velocity components in turn generating secondary turbulences for aiding mixture of fuel and air for combustion, the ratio of the combustion chamber volume to the combustion chamber depth being 23.00 $cm^2$ to 25.00 $cm^2$, the diameter of said combustion chamber throat being 0.81 to 0.899 times the maximum combustion chamber diameter D, the depth of said throat being 0.035 to 0.123×D, the maximum combustion chamber depth measured from said piston crown being 0.719 to 0.825×D, the radius giving the inclination or curvature of said combustion chamber wall having a length of from 1.053 to 1.14×D and a starting point which moves on an imaginary circle which is at a distance of 0.561 to 0.632×D from the longitudinal axis of said combustion chamber wall and at a depth of 0.404 to 0.474×D measured from said piston crown, and the radius giving the transition from said combustion chamber wall to said combustion chamber bottom having a length 0.07 to 0.14×D and a starting point which moves on an imaginary circle which is at a distance of 0.333 to 0.404×D from the longitudinal axis of said combustion chamber and at a distance of 0.07 to 0.14×D from said combustion chamber bottom.

4. An internal combustion engine having in a respective piston crown a combustion chamber for accommodating, at the end of a compression stroke, substantially all of the air for combustion, said combustion chamber comprising a constricted throat, a combustion chamber wall, and a combustion chamber bottom, and, for imparting to air for combustion a rotation about the longitudinal axis of said combustion chamber, being in the shape of a body of revolution; the maximum combustion chamber diameter, the combustion chamber depth, the inclination or curvature of said combustion chamber wall, and the inclination or curvature of the transition from said wall to said combustion chamber bottom being matched, taking into account the respectively specified combustion chamber volume, in such a way that when air for combustion is introduced and rotates in said combustion chamber, the friction occurring between said combustion chamber wall and the rotating air is utilized for producing a boundary layer or interface flow, resulting in velocity components of a predetermined intensity extending in a direction at least substantially perpendicular to the rotating motion of the air, said velocity components in turn generating secondary turbulences for aiding mixture of fuel and air for combustion, the ratio of the combustion chamber volume to the combustion chamber depth being 22.75 $cm^2$ to 22.99 $cm^2$, the diameter of said combustion chamber throat being 0.81 to 0.879 times the maximum combustion chamber diameter D, the depth of said throat being 0.034 to 0.212×D, the maximum combustion chamber depth measured from said piston crown being 0.707 to 0.81×D, the radius giving the inclination or curvature of said combustion chamber wall having a length of from 0.707 to 0.81×D and a starting point which moves on an imaginary circle which is at a distance of 0.224 to 0.293×D from the longitudinal axis of said combustion chamber and at a depth of 0.345 to 0.431×D measured from said piston crown, and the radius giving the transition from said combustion chamber wall to said combustion chamber bottom having a length of 0.103 to 0.172×D and a starting point which moves on an imaginary circle which is at a distance of 0.276 to 0.345×D from the longitudinal axis of said combustion chamber and at a distance of 0.103 to 0.172×D from said combustion chamber bottom.

5. An internal combustion engine having in a respective piston crown a combustion chamber for accommodating, at the end of a compression stroke, substantially all of the air for combustion, said combustion chamber comprising a constricted throat, a combustion chamber wall, and a combustion chamber bottom, and, for imparting to air for combustion a rotation about the longitudinal axis of said combustion chamber, being in the shape of a body of revolution; the maximum combustion chamber diameter, the combustion chamber depth, the inclination or curvature of said combustion chamber wall, and the inclination or curvature of the transition from said wall to said combustion chamber bottom being matched, taking into account the respectively specified combustion chamber volume, in such a way that when air for combustion is introduced and rotates in said combustion chamber, the friction occurring between said combustion chamber wall and the rotating air is utilized for producing a boundary layer or interface flow, resulting in velocity components of a predetermined intensity extending in a direction at least substantially perpendicular to the rotating motion of the air, said velocity components in turn generating secondary turbulences for aiding mixture of fuel and air for combustion, the ratio of the combustion chamber volume to the combustion chamber depth being 14.8 $cm^2$ to 16.00 $cm^2$, the diameter of said combustion chamber throat being 0.825 to 0.895 times the maximum combustion chamber diameter D, the depth of said throat being 0.035 to 0.123×D, the maximum combustion chamber depth measured from said piston crown being 0.614 to 0.702×D, the radius giving the inclination or curvature of said combustion chamber wall having a length of from 0.614 to 0.702×D and a starting point which moves on an imaginary circle which is at a distance of 0.123 to 0.193×D from the longitudinal axis of said combustion chamber and at a depth of 0.316 to 0.386×D measured from said piston crown, and the radius giving the transition from said combustion chamber wall to said combustion chamber bottom having a length of 0.105 to 0.175×D and a starting point which moves on an imaginary circle which is at a distance of 0.298 to 0.368×D from the longitudinal axis of said combustion chamber and at a distance of 0.105 to 0.175×D from said combustion chamber bottom.

* * * * *